(12) United States Patent
Bowman et al.

(10) Patent No.: US 7,631,079 B1
(45) Date of Patent: Dec. 8, 2009

(54) SYSTEM AND METHOD OF MESSAGING AND OBTAINING MESSAGE ACKNOWLEDGEMENT ON A NETWORK

(76) Inventors: Chris Bowman, 4203 Mangrove Cave Ct., Round Rock, TX (US) 78681; David Daugherty, 4907 Trail W. Dr., Austin, TX (US) 78735; Charles Flynn, 4408 Heights Dr., Austin, TX (US) 78746; Frank Sheiness, 13429 Gent Dr., Austin, TX (US) 78729

( * ) Notice: Subject to any disclaimer, the term of this patent is extended or adjusted under 35 U.S.C. 154(b) by 323 days.

(21) Appl. No.: 11/804,934

(22) Filed: May 21, 2007

(51) Int. Cl.
G06F 15/173 (2006.01)
G06F 15/16 (2006.01)

(52) U.S. Cl. .................. 709/225; 709/223; 709/224; 709/246

(58) Field of Classification Search ......... 709/223–226, 709/246
See application file for complete search history.

(56) References Cited

U.S. PATENT DOCUMENTS 6,856,809 B2 * 2/2005 Fostick .................. 455/466
6,895,234 B1 * 5/2005 Laursen et al. ............ 455/403
7,047,019 B1 * 5/2006 Cox et al. ................ 455/456.1
7,051,045 B2 * 5/2006 Cirinna et al. ........... 707/104.1
7,366,795 B2 * 4/2008 O'Neil et al. .............. 709/246
2002/0165846 A1 * 11/2002 Richer et al. ................ 707/1
2003/0186680 A1 * 10/2003 Bhasin et al. .............. 455/411
2004/0076128 A1 * 4/2004 Rao et al. .................. 370/328
2004/0198390 A1 * 10/2004 Kaise .................... 455/456.1
2005/0183061 A1 * 8/2005 Papanikolaou et al. ...... 717/103
2007/0288543 A1 * 12/2007 Evans et al. ................ 709/200

* cited by examiner

Primary Examiner—Hussein Elchanti

(57) ABSTRACT

A system and method for messaging and obtaining message acknowledgement on a limited-area network managed by a network management device connected to a wide-area network. The system allows messages to target individual end user devices and receive message acknowledgement from end users. The method allows the recipient of an individually targeted message to prevent service interruption or to be rewarded by acknowledging receipt of a message.

19 Claims, 2 Drawing Sheets

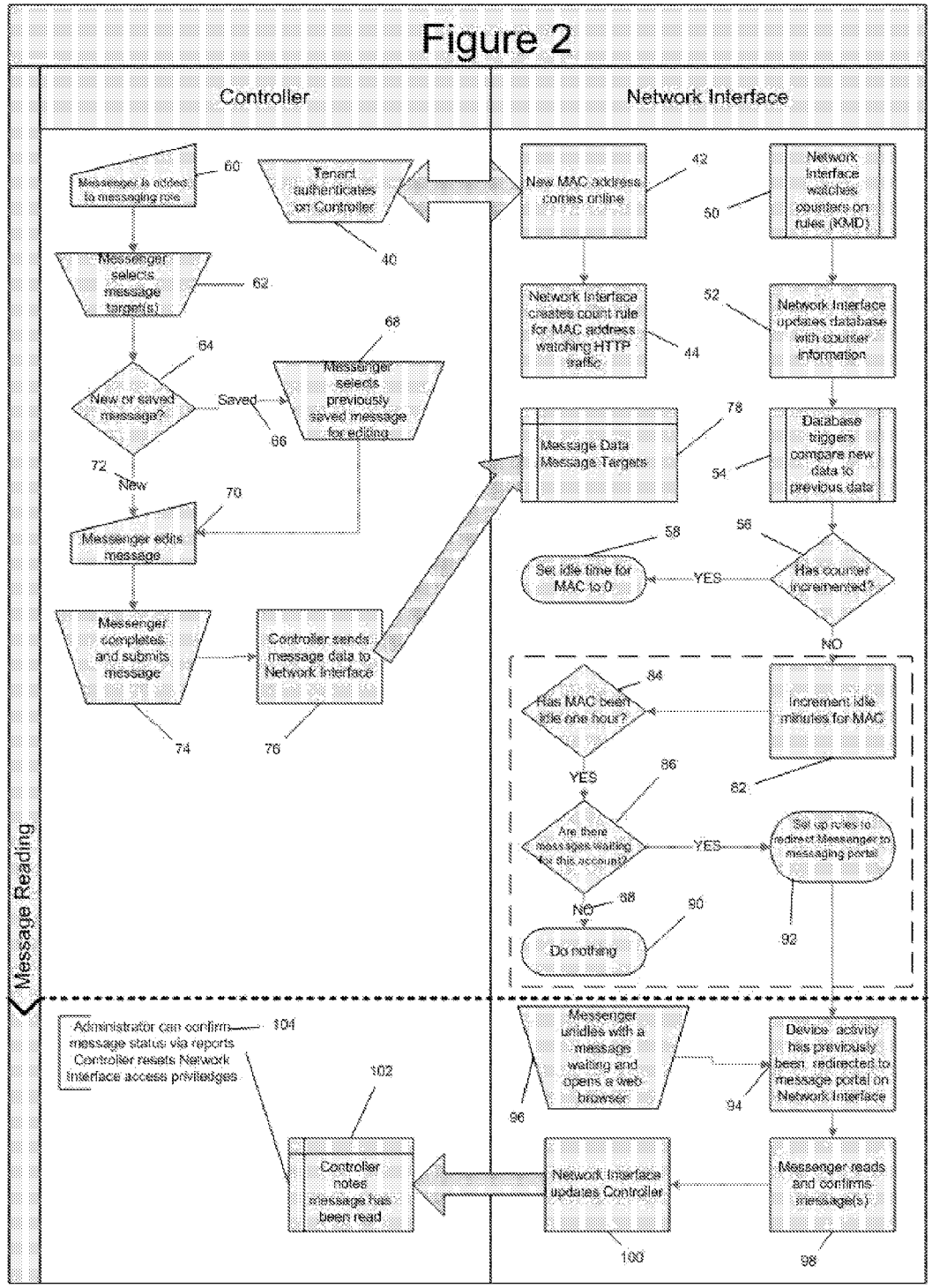

SYSTEM AND METHOD OF MESSAGING AND OBTAINING MESSAGE ACKNOWLEDGEMENT ON A NETWORK

BACKGROUND OF THE INVENTION

1. Field of the Invention

The present invention is generally related to the distribution of messages and the receipt of an acknowledgement that the message was received. The system and method of messaging and obtaining message acknowledgement on a network has particular utility in connection with targeted advertising and messaging to individual nodes on a computer network.

2. Description of the Prior Art

Electronic distribution of messages individuals is typically facilitated through email. Although e-mail from senders known to the receiver, including solicited e-mails approved by the receiver, are often welcomed by the receiver, unsolicited messages are often viewed with disdain. Advertisers, looking for expedient and cost-effective means of reaching target markets tend to abuse this form of communication. The abuse has become so pronounced that unsolicited e-mails generally referred to as spam, which is a derogatory term, and has generated demand for spam-blocking software. Such software is often able to block unsolicited messages, but the prevalence of spam, as well as fear of computer viruses, has prompted many recipients to ignore and delete any e-mails emanating from unknown senders. Use of known systems, such as e-mail acknowledgement receipts, also relies on the receiver to allow such receipts to be sent. This has made it difficult to communicate via a computer network with some individuals on the network, and to verify that a message was received.

To resolve this problem, what is needed is a method of reaching targeted recipients that is less subject to abuse, more controllable, and not identified as spam and subsequently blocked or ignored by the recipient. More specifically, what is needed is a network management system that will facilitate the delivery of messages using captive portals and allow for the specific acknowledgement of such messages. The present invention provides the ability to redirect individual host network devices and groups of host network devices to a captive portal until the message or advertisement has been acknowledged. The network management system must also include a method of providing incentives for all those who elect to receive advertisements.

Electronic messaging systems are known in the prior art. In addition to well-known systems such as e-mail and instant messaging, other systems and methods have been developed to communicate with network users. Numerous systems exist for identification, acknowledgement and filtration of e-mail. Systems for filtration of instant messaging, such as the one disclosed by Lu in U.S. Pat. No. 7,174,453, are also known, as are other messaging and acknowledgement techniques. For example, U.S. Pat. No. 7,185,209 to Langworthy, et al. discloses End-to-end reliable messaging with complete acknowledgement. However, the Langworthy '209 patent is primarily concerned with sending messages and obtaining acknowledgement regardless of transport protocol, and does not use a captive portal or limit use of a precise node prior to acknowledgement.

While the above-described methods and systems fulfill their respective, particular objectives and requirements, the aforementioned patents do not describe a captive portal method of redirecting an individual network-attached device, such as a computer, from worldwide network access to a limited-access network until a particular message is acknowledged. A need exists for a new and improved system and method of messaging and obtaining message acknowledgement on a network that can be used to manage and obtain receipt from individual network devices. In this regard, the present invention substantially fulfills this need. In this respect, the system and method of messaging and obtaining message acknowledgement on a network according to the present invention substantially departs from the conventional concepts and designs of the prior art, and in doing so provides an apparatus primarily developed for the purpose of messaging and obtaining message acknowledgement. Additionally, the system allows for both limiting network access and rewarding recipients based upon user acknowledgement of messages.

SUMMARY OF THE INVENTION

In view of the foregoing disadvantages inherent in the known types of computer messaging now present in the prior art, the present invention provides an improved system for managing messaging on a computer network, and overcomes the above-mentioned disadvantages and drawbacks of the prior art. As such, the general purpose of the present invention, which will be described subsequently in greater detail, is to provide a new and improved system and method for managing messaging on computer network which has all the advantages of the prior art mentioned heretofore and many novel features that result in a system and method for managing messaging on a computer network which is not anticipated, rendered obvious, suggested, or even implied by the prior art, either alone or in any combination thereof.

To attain this, the present invention essentially comprises a network management device that manages a limited area network. The network management device is an in-line device located between an end user and a wide area network, such as the worldwide network known as the Internet. The network management device allows users in the limited area to connect to the wide area network. Each user device connected to the limited area network has a unique attribute, such as a MAC address. Additionally, each end user may have a unique attribute, such as a user account. A controller, which is attached to, or incorporated within, the network management device, controls access of the individual user accounts and devices to the wide area network. In practice, a message is sent to an individual user account or to a particular user device. The controller can limit access of the user account or the individual device to the wide area network until acknowledgement of the message is conveyed by the user or the device and recorded by the controller through the network management device.

The present invention also provides a method of managing messaging on a limited-area network comprising the steps of issuing an end user account for limited area network end users; establishing end user access rules for each end user account; authenticating and recording uniquely-identifiable devices on the limited area network via a network management device; establishing an access rule for the uniquely-identifiable device on the wide area network; enabling a messenger to send targeted messages to devices and end users attached to the network; providing access to a wide area network from the limited area network; sending a targeted message to the device; limiting access to the wide area network for the uniquely-identifiable device until the message is acknowledged by a user of the device; and reestablishing the wide area network connection once the message has been acknowledged by the user of the device. Optionally, end user and device access rules may be altered when the wide area network connection is reestablished, by either granting the end user or the device additional wide area network access privileges or other actions may be generated as a result of the end user response.

There has thus been outlined, rather broadly, the more important features of the invention in order that the detailed description thereof that follows may be better understood and in order that the present contribution to the art may be better appreciated.

The invention may also include a time delay loop and control access to multiple wide area network services. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved messaging and acknowledgement system that has all of the advantages of the prior art and none of the disadvantages. It is another object of the present invention to provide a new and improved method of messaging and acknowledgement that may be easily and efficiently used and deployed. Still another object of the present invention is to provide a new system of messaging and acknowledgement on a network that provides in the apparatuses and methods of the prior art some of the advantages thereof, while simultaneously overcoming some of the disadvantages normally associated therewith.

Lastly, it is an object of the present invention to provide a new and improved method of managing messaging on a network, by limiting access or rewarding end users for acknowledging messages.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which preferred embodiments of the invention are illustrated

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a flow chart of the method of messaging and obtaining message acknowledgement on a network of the present invention.

The same reference numerals refer to the same parts throughout the various figures.

DESCRIPTION OF THE PREFERRED EMBODIMENT

Figure 1:
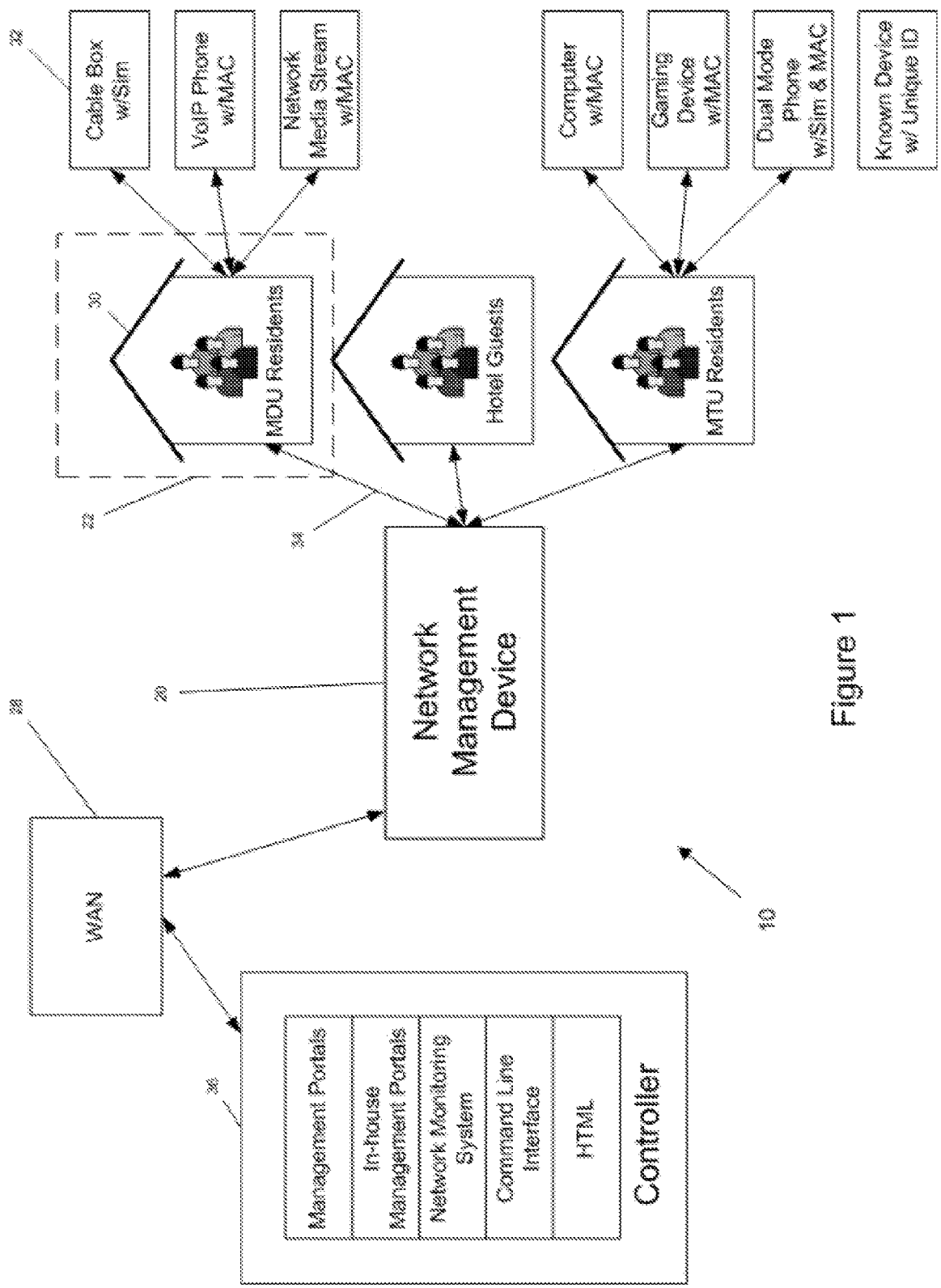
FIG. 1 is a diagram of the preferred embodiment of the system of messaging and obtaining message acknowledgement on a network constructed in accordance with the principles of the present invention.

Referring now to the drawings, and particularly to FIGS. 1 and 2, a preferred embodiment of the system of messaging and obtaining message acknowledgement on a network of the present invention is shown in FIG. 1 and generally designated by the reference numeral 10; a preferred embodiment of the method of messaging and obtaining message acknowledgement on a network of the present invention is shown in FIG. 2 and generally designated by the reference numeral 10.

In FIG. 1, a new and improved system of messaging and obtaining message acknowledgement on a network 10 of the present invention for is illustrated and will be described.

The present invention essentially comprises a network management device 20 to manage a limited area network 22. The network management device 20 comprises a controller, such as a computer, to manage data. The limited area may consist of a single office, building, residential complex, college campus, neighborhood or city, or may be a non-geographic area, such as the users of an Internet Service Provider, a cable network or a telephone system. It is noted that the limited area may have a common demographic, such as college students; or residents of, or workers in, a particular geographic area or common living area or office building, referred to by those skilled in the art as a multiple dwelling unit (MDU), or a multiple tenant unit (MTU). The network may be a computer network, a cable television network, or a phone network. The network management device 20 is attached to a wide area network 28, such as the worldwide network known as the Internet, a television channel aggregator such as a cable television operations unit, a telephone network or another data network. The network management device allows end users 30 in the limited area to connect to the limited area network, providing a portal to the wide area network 28. User devices 32, such as computers, video game devices, media servers, cable boxes or telephones, may be connected to the limited area network. User devices 32 may also include public devices intended for multiple users, such as a digital concierge, access control touch pad, or any other networkable device. Each user device connected to the limited area network has a unique attribute, such as a MAC (Media Access Control) address, a SIM (end user identity module), or other access control attribute. Optionally, each end user 30 has a unique attribute, such as a user account. The user accounts and unique user device attributes may be linked, allowing identification of multiple users using the same user device, and also allowing the user to be identified via the user device. The user device 32 connection 34 may be via a wired node, or via a wireless connection: using a unique device attribute and a user account allows the network management device to recognize the user device regardless of how or where it connects to the limited area network. A controller 36 connected to the network management device controls access of the individual user accounts and devices to the wide area network. In the current embodiment, an end user may access a controller interface and purchase additional network access rights, services or bandwidth. The controller 36 may be at a remote site, and manage the network by communicating with the network management device 20 through the wide area network 28. In practice, a message is sent to an individual user account or to a particular user device. The message may emanate from the controller 36, and be pushed to particular user devices 32, by device type, to individual devices or to particular user accounts. The controller 36 can limit access of the end user 30 user account or the individual user device 32 to the wide area network 28 until acknowledgement of the message is conveyed by the user or the device and recorded by the controller. For example, a message may be sent to a cable box 32 and the controller 36 may block access to television channels until the end user 30 presses a button on the cable box or a key on an associated remote control to acknowledge the message. Optional methods of acknowledging receipt of the message, such as a visit to an office, payment of a bill via funds transfer from a specific website or payment in person, or other forms of action or contact may also be employed for receipt by the controller. In the case of such options, the action or contact would be conveyed to the messenger who could then reset the controller message status. A message may be sent via Hyper-Text Markup Language (HTML) and limit computer 32 access to the Internet until a particular keyboard key is pressed, a dialog box is selected, an acknowledgement e-mail is sent or a particular website is visited.

In a current embodiment of the invention, the network management device 20 controls access to multiple wide area networks, including a data network, specifically Internet access, and an audiovisual network, namely a cable television system. Also in the current embodiment of the invention, a single controller in a single office controls multiple network management devices dispersed throughout a wide geographic region.

The limitation may be controlled by the network administrator to either total limitation, such as the inability to access the Internet, television stations, participate in multi-user games across the network, or complete phone limitation, or partial limitation, such as allowing access only to particular websites, particular television stations, such as the local over-the-air stations, or particular phone numbers, such as emergency access calls or local access and transport area calls. Additionally, although the term limitation has been used in describing the action resulting from this invention, those skilled in the art will readily appreciate that the limitation can also be a lifting, rather than a restriction, resulting in a reward, such as granting additional access to one of the networks controlled by the network management device 20. For example, acknowledgment of a particular message could result in access to a premium television station, free access to a subscription website, additional calling time or free or discounted calls, or in other rewards. The limitation or reward is not limited to the network received by the device. For example, a network management device may manage both computer and audiovisual wide area networks. Acknowledging a message sent to a computer web browser could result in free access to a premium television station, additional bandwidth for a gaming device, free music downloads for a personal music player, or in a code or coupon to be used at a local bricks and mortar establishment apart from the network or to be redeemed for service credits or discounts.

Turning now to FIG. 2, new and improved method of messaging and obtaining message acknowledgment on a network 10. Initially, an end user is authenticated 40 on the network management device by the controller. The end user connects 42 a user device identifiable by a unique attribute to the network management device. A rule for the particular device, based upon subscription privilege level and device type, is then created 44 within the network management device and the device is connected to the wide area network. A message is then sent from the network management device to the user device or account. Either simultaneous with the sending of the message or after a specified delay, the device connection or user account is captured, either via partially or totally limiting access of the device or the end user account to the wide area network. When a message is sent, the network management device tracks the message via a counter set by the controller 50. The counter can be incremented to account for time delays prior to user intervention 52. User intervention resets the counter, so by comparing prior counter data with current counter data 54, it can be discerned whether user intervention has occurred, as a lower counter value would indicate that user intervention has occurred, whereas either an equal counter value in a binary system or, if the counter was incremented over time 56, a higher counter value would indicate that no user intervention has occurred 58.

In FIG. 2, a network administrator or other enabled messenger is given messaging rights 60. The messenger can then select a message target or targets based upon the end user or device 62. A previously-stored message, such as a prepared system or end user warning, a previously-created message, or a message prepared by an outside source, such as an administrative authority or advertiser, can be selected or the messenger can decide to create a new message 64. If a saved message is chosen 66, the user may select it 68 and then edit it 70. If the messenger decides to enter a new message 72, the messenger may create it by editing a blank message 70. Once the messenger completes the message, it may be submitted to the controller 74, which then submits 76 the message to the network management device, which transmits the message data to the indicated targets 78.

An optional time-delay loop can delay capturing of the end user portal prior to limitation of services. The time-delay loop is dependent upon time increments 82, such as minutes, that a device has had an idle network connection. After a specified time interval, such as an hour 84, the network management device can then determine whether messages are waiting for the account 86. If no messages are waiting 88, meaning the end user has acted upon the messages sent, the network management device does nothing 90, thereby allowing the end user to use all services. If messages are waiting, the network management device can then implement rules 92 residing in the network management device or received from the controller. Although a time-delay loop prior to access limitation has been shown and described, one skilled in the art will readily appreciate that the time-delay loop could work in an opposite manner, limiting access for a predetermined time interval, without deviating from the spirit and scope of the invention. If the optional time-delay loop method is not employed, the rules are implemented simultaneous with the sending of the message.

Turning towards the bottom of FIG. 2, it is shown and described that simultaneous with the message or after or before an optional time-delay loop, the device portal is captive 94, and all activity is redirected to a messenger or administrator selected interface. This limits access to the wide area network, either by totally preventing access to the wide area network service, substituting a particular screen or message for a television signal, telephone dial tone or webpage, or providing a limitation on the areas of the wide area network that may be accessed. The limited access state will continue awaiting the network connection to no longer be idle and the message to be received by the user. The end user must then confirm receipt of the message 98 in order for the network management device to notify the controller of the message receipt 100, thereby updating the controller 102 of the status, which will prompt the controller to record the notification, thereby constituting acknowledgement of the message by the end user, and lift limitations or grant additional access and provide a report to the system administrator 104.

Once the figures have been reviewed and explained, it can be readily appreciated that the system and method of messaging and obtaining message acknowledgement on a network has a wide variety of uses. For example, a administrative authority, such as a network service provider, building management company, neighborhood association, campus administration or government entity, could use the invention to provide specific reminders of payments prior to discontinuing services or to warn of infractions of covenants or regulations. Another administrative authority, such as a college coach or dorm manager, could use the system to conduct a curfew check or issue bulletins. A network administrator could also use the system to shunt and warn of inappropriate network use, such as potential copyright infringements when a notice is received under the Digital Millennium Copyright Act (DMCA), or any detected use contrary to network policy. Advertising and promotions could also be conducted using the system by altering limitations, thereby changing the rule for a particular device or end user account by increasing services rather than decreasing services, or by providing codes or coupons for offline use. System rewards could include, without limitation, bandwidth upgrades, premium cable channels access, or VOIP phone service; such rewards could be provided for a predetermined amount of time as set by the network administrator or paid for by the advertiser. New data services could also be advertised by cross-promotion of the network services offered via the network management device. Codes and coupons could provide traditional discounts or samples, or provide other rewards, including premium network access, purchased for the end user by the advertiser. The advertiser could give the end user additional rewards for providing additional information, or multiple advertisers may pool resources by offering multiple entries into a common raffle.

While a preferred embodiment of the system and method of messaging and obtaining message acknowledgement on a network has been described in detail, it should be apparent that modifications and variations thereto are possible, all of which fall within the true spirit and scope of the invention. With respect to the above description then, it is to be realized that the optimum dimensional relationships for the parts of the invention, to include variations in components, assembly and use, are deemed readily apparent and obvious to one skilled in the art, and all equivalent relationships to those illustrated in the drawings and described in the specification are intended to be encompassed by the present invention. For example, although the network management device and controller are shown as discrete objects, which allows a single controller to control multiple network management devices, the network management device and controller may comprise a single integrated unit. While computer data, audiovisual and voice communication data has been described, the system may be employed to manage messaging over any data network.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A system for managing messaging on a limited-area network comprising:
    a network management device attached to a wide area network;
    a limited area network attached to said network management device, said limited area network capable of connecting network devices identified by a unique attribute to said network management device;
    a controller attached to said network management device;
    wherein said controller authenticates a particular network device identified by its unique attribute;
    wherein responsive to authenticating said particular network device identified by its unique attribute, said controller creates a first access rule within said network management device for said particular network device;
    wherein said network management device provides a level of access to a wide area network from said limited area network to said particular network device pursuant to said first access rule;
    wherein responsive to a message sent to said particular network device identified by its unique attribute, said controller creates a second access rule within said network management device for said particular network device;
    wherein said second access rule limits access to the wide area network by said particular network device identified by its unique attribute more than said first access rule;
    wherein said network management device provides a level of access to said wide area network from said limited area network pursuant to said second access rule until said message sent to said particular network device is acknowledged by a user of said particular network device; and
    wherein responsive to said user acknowledging said message, said network management device provides a level of access to said wide area network from said limited area network pursuant to said first access rule.

2. The system of claim 1 wherein said controller is attached to said network management device via said wide area network.

3. The system for managing messaging on a limited-area network of claim 1 wherein said device unique attribute is a MAC address.

4. The system for managing messaging on a limited-area network of claim 1 wherein said wide area network is a worldwide computer network.

5. The system for managing messaging on a limited-area network of claim 1 wherein said device unique attribute is an end user Identification Module.

6. The system for managing messaging on a limited-area network of claim 1 wherein said wide area network is an audiovisual network.

7. The system for managing messaging on a limited-area network of claim 1 wherein said wide area network is telephone service network.

8. The system for managing messaging on a limited-area network of claim 1 wherein said device unique attribute is an end user account.

9. A method for managing messaging on a limited-area network comprising the steps of:

authenticating a uniquely-identifiable device on the limited area network via a network management device;

establishing a first access rule for the uniquely-identifiable device on a wide area network;

providing access to the wide area network from the limited area network pursuant to the first access rule;

sending a targeted message to the device;

limiting access to the wide area network by the uniquely-identifiable device by a second access rule that is more restrictive than the first access rule until the message is acknowledged by a user of the device; and reestablishing the wide area network connection pursuant to the first access rule once the message has been acknowledged by the user of the device.

10. The method for managing messaging on a limited-area network of claim 9 further comprising:

waiting for a predetermined time interval after the sending step and prior to the limiting step.

11. The method for managing messaging on a limited-area network of claim 9 wherein the step of reestablishing the wide area network connection further comprises reestablishing the wide area network connection pursuant to a third access rule for the uniquely-identifiable device on the wide area network for a predetermined time prior to reestablishing the wide area network connection pursuant to the first access rule, wherein the third access rule is less restrictive than the first access rule.

12. The method for managing messaging on a limited-area network of claim 9 further comprising:

issuing an end user account for limited area network end users;

establishing end user access rules for each end user account.

13. The method for managing messaging on a limited-area network of claim 9 wherein the step of reestablishing the wide area network connection further comprises altering the rules for the end user account on the wide area network for a predetermined time.

14. The method for managing messaging on a limited-area network of claim 9 further comprising enabling a messenger to send targeted messages to devices attached to the network.

15. A method for managing messaging on a limited-area network comprising the steps of:

issuing an end user account for limited area network end users;

establishing end user access rules for each end user account;

authenticating a uniquely-identifiable device on the limited area network via a network management device;

establishing a first wide area network access rule for the uniquely-identifiable device;

enabling a messenger to send targeted messages to devices and end users attached to the network;

providing access to a wide area network from the limited area network pursuant to the first wide area network access rule;

sending a targeted message to the device;

limiting access to the wide area network by the uniquely-identifiable device by providing access to the wide area network from the limited area network pursuant to a second wide area network access rule that is more restrictive than the first wide area network access rule until the message is acknowledged by a user of the device; and reestablishing the wide area network connection pursuant to the first wide area network access rule once the message has been acknowledged by the user of the device.

16. The method for managing messaging on a limited-area network of claim 15 wherein the step of reestablishing the wide area network connection further comprises reestablishing the wide area network connection pursuant to a third wide area network access rule for the uniquely-identifiable device on the wide area network for a predetermined time prior to reestablishing the wide area network connection pursuant to the first wide area network access rule, wherein the third wide area network access rule is less restrictive than the first wide area network access rule.

17. The method for managing messaging on a limited-area network of claim 15 wherein the providing access to a wide area network from the limited area network step includes providing access to a plurality of wide area networks.

18. The method for managing messaging on a limited-area network of claim 17 wherein the plurality of wide area networks include data and audiovisual networks.

19. The method for managing messaging on a limited-area network of claim 18 wherein the step of reestablishing the wide area network connection further comprises altering the rules for the end user account on the wide area network for a predetermined time.

* * * * *